March 29, 1966 G. S. BROWN 3,243,163
VISCOUS AND NON-VISCOUS MATERIAL PROCESSING SYSTEM
Filed July 1, 1963 6 Sheets-Sheet 1

INVENTOR.
GORDON S. BROWN

March 29, 1966  G. S. BROWN  3,243,163
VISCOUS AND NON-VISCOUS MATERIAL PROCESSING SYSTEM
Filed July 1, 1963  6 Sheets-Sheet 2
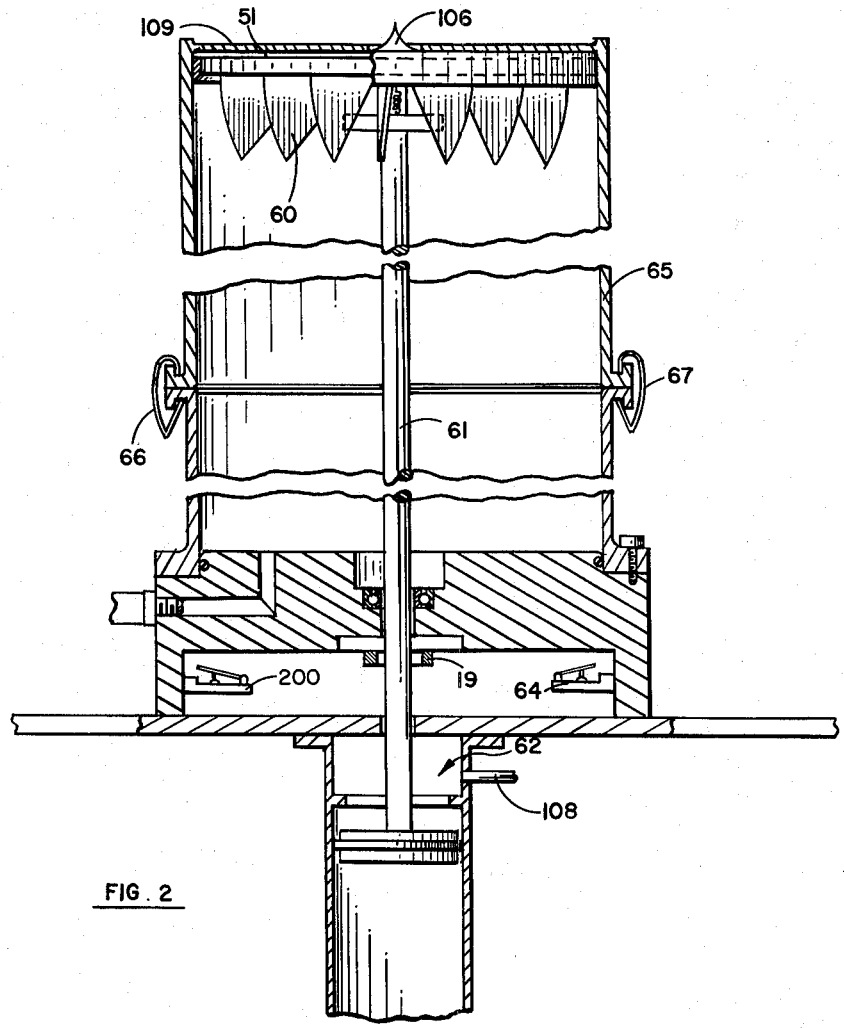
FIG. 2
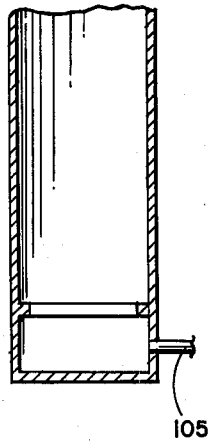
INVENTOR.
GORDON S. BROWN

INVENTOR.
GORDON S. BROWN

INVENTOR.
GORDON S. BROWN

March 29, 1966  G. S. BROWN  3,243,163
VISCOUS AND NON-VISCOUS MATERIAL PROCESSING SYSTEM
Filed July 1, 1963  6 Sheets-Sheet 5

INVENTOR.
GORDON S. BROWN

INVENTOR.
GORDON S. BROWN 3,243,163
VISCOUS AND NON-VISCOUS MATERIAL PROCESSING SYSTEM
Gordon S. Brown, Anaheim, Calif., assignor to North American Aviation, Inc.
Filed July 1, 1963, Ser. No. 291,746
4 Claims. (Cl. 259—7)

This invention relates to a system for semi-automatically processing both viscous and non-viscous materials and more particularly to a system for semi-automatically preparing viscous and non-viscous materials combined with another material for application and for semi-automatic and simultaneous cleaning of the system during the preparation.

Materials are presently processed by a combination of manual operations and individual pieces of equipment. Cleaning of the equipment is generally accomplished manually. Systems controlled manually often are inefficient, slow, unreliable and do not provide the exact control required to prepare a material so that each element comprising the material is precisely weighed and mixed. Foreign matter introduced during the processing contributes to shortened material life and may result in failure of equipment utilizing the processed materials.

The device of this invention is comprised of a system for forcibly extracting viscous and non-viscous first materials from an original container into a second container semi-automatically and for transferring the first material from the second container into a third container for weighing an exact amount of the material as predetermined for a particular use. This system includes a device for measuring an exact amount of a second material such as a catalyst to be mixed with the first material in the third container and includes means for injecting the second material into the container with the first material. Excess gases entrapped or those which may be released during the processing are pulled from the material in the weighing container by means of a vacuum pump connected thereto. Degassing may be done during any part or all of the cycle. The second material and the first material are mixed by means of a mixing head assembled as part of a turret. After mixing, the turret is raised and rotated so that the mixing head is removed from the weighing container (third container) and an extruding head and piston replaces it in the weighing container. The system further comprises a fourth container holding a solvent for cleaning the mixing head while the extruding head is in the third container. When the inverse is true, the extruding head is being cleaned by the solvent. A motor is activated to start extruding the mixed compound from the weighing container into a mold or other device for its use after being processed by the system.

The system enables an operator to process materials in a production line fashion and at the same time increase the reliability of the end product. While a processed mixture is being extruded into a mold from the third container, another material may be extruded and loaded into the receiving container and at the same time the mixer blade may be cleaned. Since there is very little exposure to the environment and no manual handling, contaminants etc., are reduced which results in increased process reliability. Less materials are wasted due to the semi-automatic and efficient extractor and extruder as opposed to using manual extractors and other extruders. The weighing device increases the overall efficiency, speed and accuracy of the system.

Therefore it is an object of this invention to provide a semi-automatic system for processing viscous and non-viscous materials from shipping container into molds.

Another object of this invention is to provide a system for accurately and semi-automatically weighing a compound, catalyzing and injecting said compound into a mold.

Still another object of this invention is to provide a system having the capability of semi-automatically and forcibly entracting material from a shipping container into a receiving container, introducing the material into a weighing container, weighing, mixing said predetermined weight of material with the required amount of a catayst, degassing and injecting said material into a mold.

Another object of this invention is to provide a system for rapid and reliably processing a material by semi-automatic means from a shipping container into a mold, including means for weighing, degassing, mixing, and catalyzing said material, including means for simultaneously cleaning said mixing head and the injecting head during the processing.

It is another object of this invention to provide a reliable, rapid, and economical system for processing viscous and non-viscous material wherein substantially all processing is done automatically.

It is another object of this invention to provide a system for eliminating hand transferring of viscous and non-viscous compounds from an original container to weighing devices and into mixing containers.

It is still another object of this invention to provide a system for processing viscous and non-viscous compounds semi-automatically from shipping container into material mold which has the additional capability of circulating a cleaning solvent through the mechanical portions of the system for cleaning the system simultaneously with the processing after a particular portion of the system has performed its function.

These and other objects of the invention will become apparent from the following description taken in connection with the accompanying drawings, in which:

FIG. 2 is a side elevation view of an embodiment of the extractor;

Figure 1:
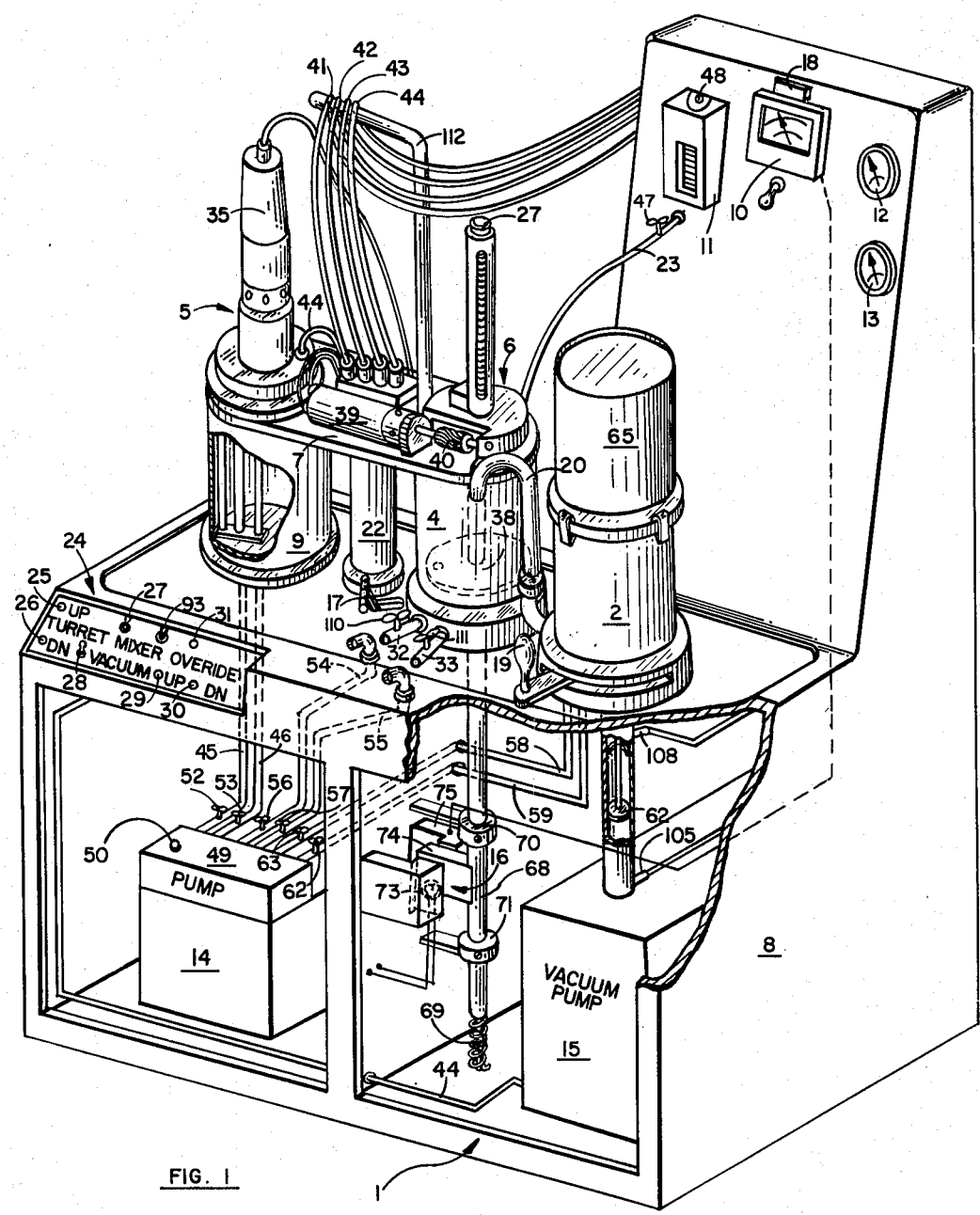
FIG. 1 is a perspective view of a specific embodiment of the processing system.
Figure 3:
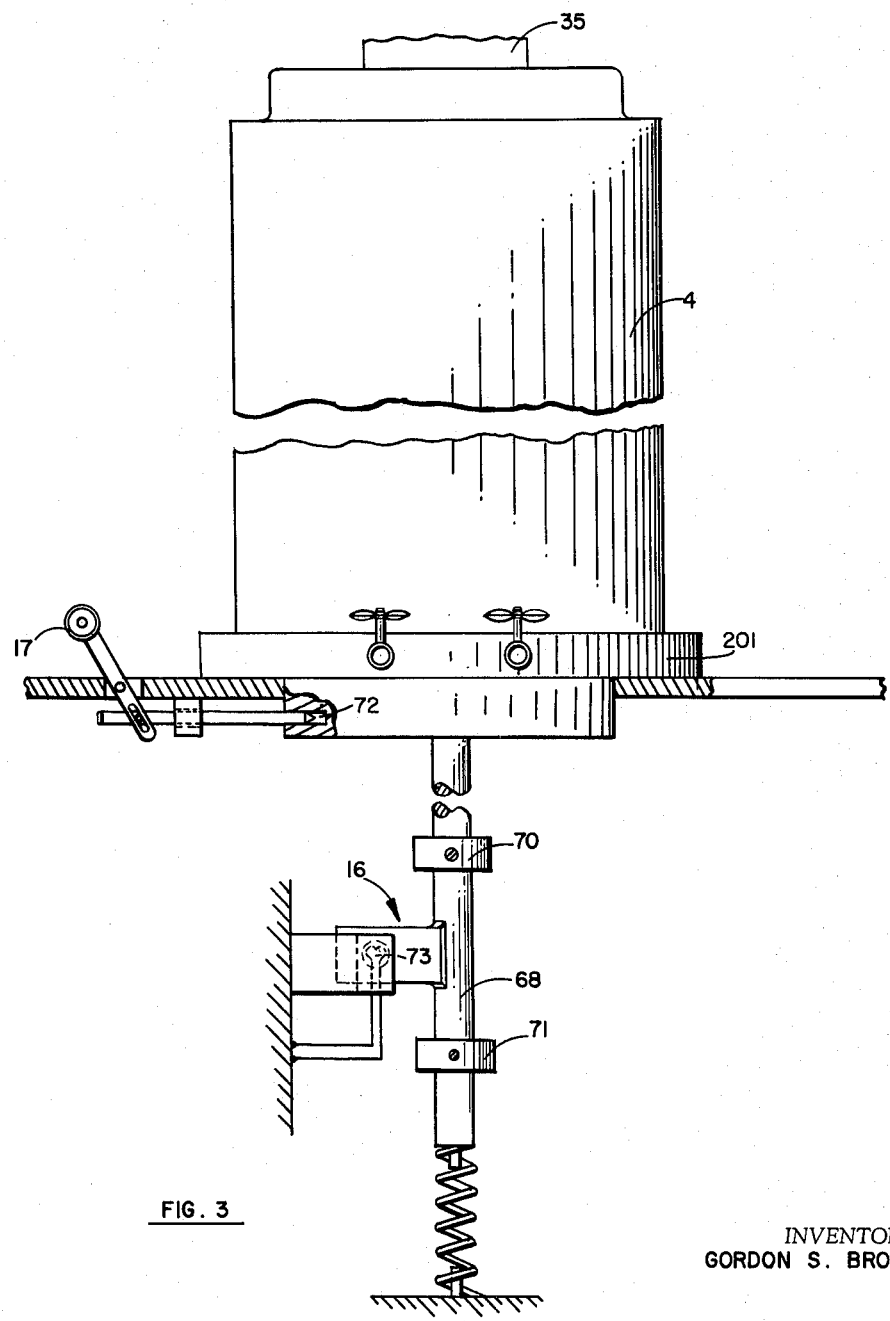
FIG. 3 is a side elevation view of an embodiment of container 4.

Referring now to FIG. 1 wherein is shown a specific embodiment of processing system 1. Receiver container 2 is attached to console 8 by means of bolts, welding, rivets, screws, etc. Extractor 3 (illustrated in FIG. 2) is mounted inside container 2. Extractor control lever 19 is movably connected to container 2. Flexible tube 20 is attached to an aperture at the base of container 2 and has a portion for directing material flow. Container 4, shown in one embodiment in FIG. 3 is spring mounted on console 8 and has tubes 32 and 33 at the base thereof and a sealable aperture (not shown) through its cylinder wall near the top for receiving tubing 23. Tube 23 may be removed and the aperture closed. The aperture may be eliminated completely and tube 23 inserted over the top of container 4 with the turret raised slightly. Locking pin 17 for locking (shown more clearly in FIG. 3) is slidably mounted on console 8 with a protruding portion for locking container 4 to console 8. The protruding portion inserts into slot 72 (see FIG. 3). Weighing device 16 is connected to container 4 on a shaft thereof. Weighing indicator 10 is fixedly attached to the raised portion of console 8 and has conductors connected to weighing device 16. Turret 7, with a rotatable, descendible and ascendible shaft enclosed within cylinder section 22, and horizontal member 21, is mounted on console 8. Mixer 5 is affixed at one end of the horizontal member and extruder 6 is affixed at another end thereof.

Figure 4:
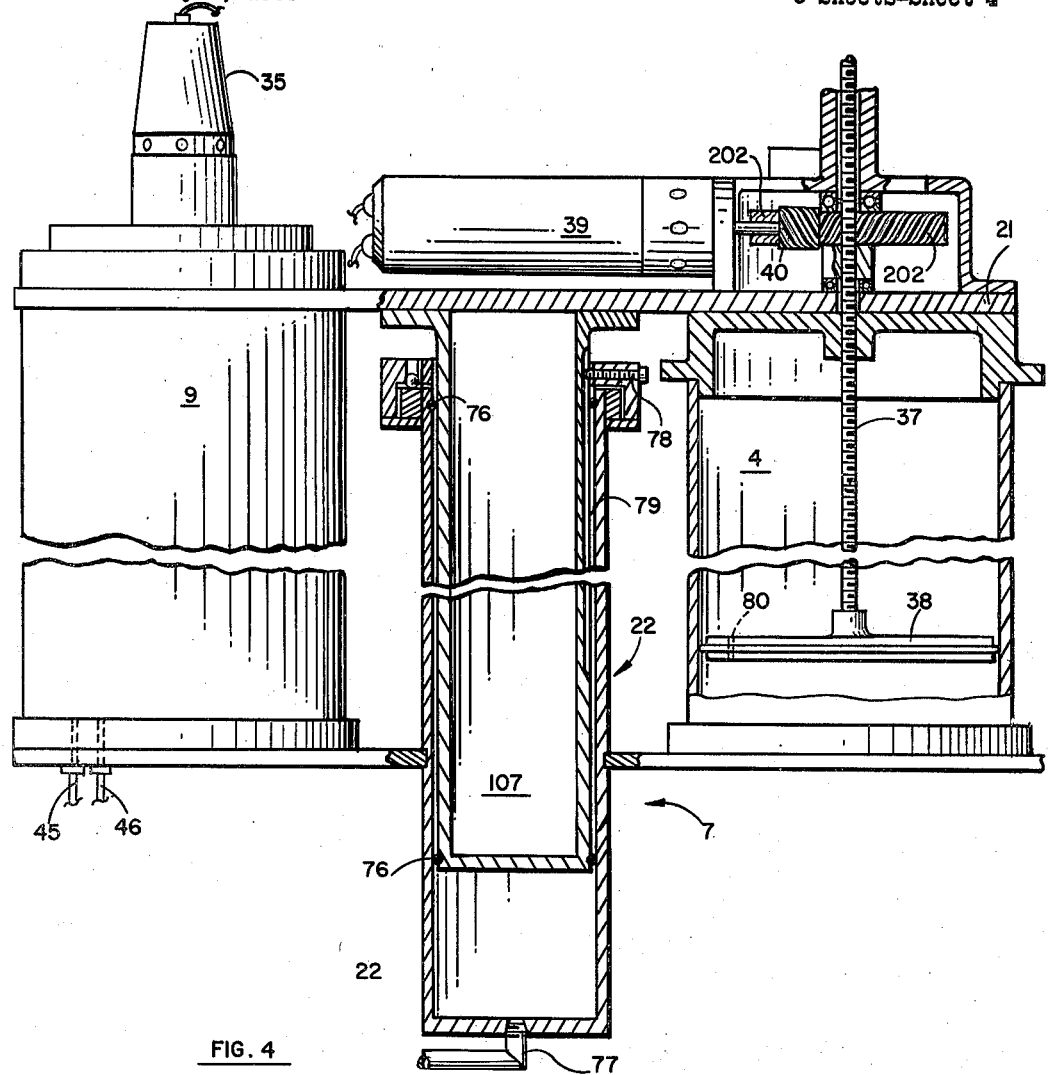
FIG. 4 is a side elevation view of an embodiment of the turret and extruder portion of the processing system.
Figure 5:
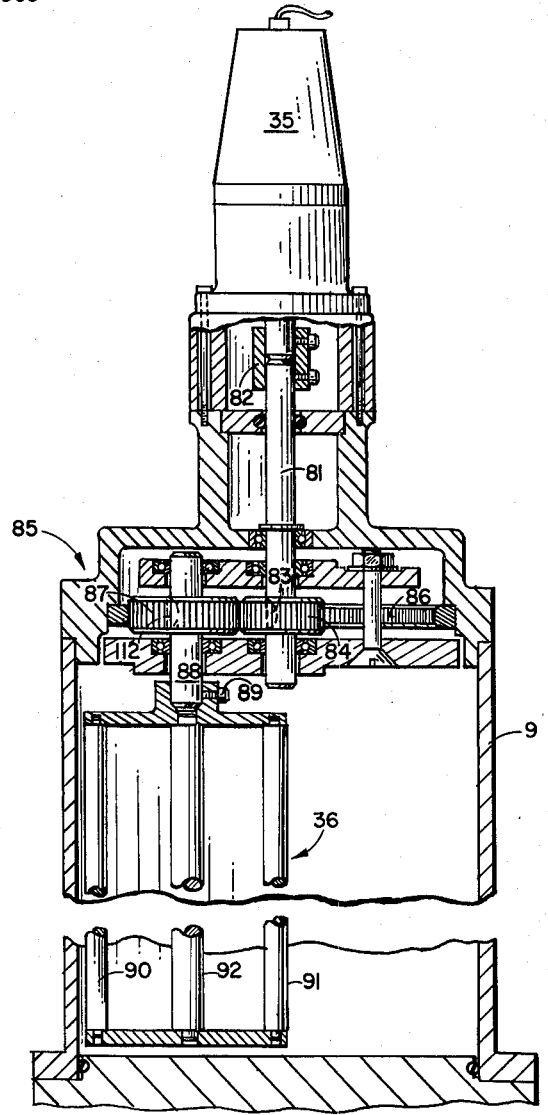
FIG. 5 is a partial section and partial view of the mixer portion.

Mixer 5 includes an air driven motor 35 and mixer paddle 36 comprising blade-like members (illustrated more clearly in FIG. 5). Extruder 6 includes a threaded shaft 37, plate 38 (illustrated more clearly in FIG. 4) connected at the end of shaft 37, air driven motor 39 mounted on horizontal member 21 and having a threaded worm-gear 40 which mates with worm wheel 202 having an inner threaded circumference area for enclosing and mating with threaded shaft 37 for driving plate 38 up or down depending on the direction of rotation of motor 39. Tubes 41, 42, 43, and 44 are also mounted on horizontal member 21 and are secured from entanglement by L-shaped member 112. Tubes 41 and 42 are connected to motor 39. Tube 43 is connected to motor 35. Tube 44 is connected through the top of mixer 5 with an opening inside container 4. Container 9, mounted on console 8, has openings at the bottom thereof and connections for mating with flexible tubes 45 and 46. Measuring device 11 affixed to the raised portion of console 8 is connected to container 4 by tube member 23. Valve means 47 including a handle portion opens and closes tube 23. Measuring device 11 includes scales for visually measuring portions placed therein through opening 48 at the top portion thereof. Vacuum pump 15 mounted inside console 8 has tube 44 connected through mixer 5, and vacuum gage 12 affixed to console 8 at the raised portion thereof.

Container 14 is also mounted inside console 8 and has a pump 49 located on top thereof. Tubes 45 and 46 connect the pump with container 9. Interrupt valve means 52 and 53, including valve handles, open or close the tubes.

Flexible tubes 54 and 55 extend from pump 49 through the console and may be connected to tubes 32 and 33 for circulating a solvent through the container after use. Valve means 56 and 57 including valve handle control solvent flow through the tubes with valve means 110 and 111 including valve handles. Flexible tubes 58 and 59 from pump 49 are connected through the base of container 2 and also have manually operated interrupt valve means 62 and 63 including handles. Many of the tubes may be eliminated by making tubes 45 and 46 detachable from container 9 and long enough to reach and connect to container 4. Also tubes 58 or 59 may be eliminated by connecting just one tube from pump 49 to material transfer tube 20 or just to hang over the edge of container 2.

Extractor 3 is raised or lowered by air pressure supplied from an air source through tubes 105 and 108 connected to the extractor. Double action air piston 62 forces the extractor up or down through a material being pulled into container 2.

Motors 35, 39 and turret 7 are also propelled by air pressure. Control panel 24, on console 8 contains switches 25, 26, 27, 28, 29, 30, 93 and 31 for actuating various portions of the processing system. The switch 50 for operating pump 49 may also be mounted on control panel 24 or it may be mounted on pump 49 as shown.

The console may be equipped with wheels in order to facilitate relocation of the system. Various electrical connectors, solenoids and valves for controlling system operation are also provided. Air pressure gage 13 and line power indicator 18 are attached to console 8.

Referring now to FIG. 2 wherein a specific embodiment of extractor 3 is shown. Extractor 3 is comprised of a perforated plate 51 and vanes 60 which are hinged along radii of plate 51. The plate has a radius approximately equal to the inner radius of container 2. Shaft 61 is connected to the center of the extractor plate and to double-acting air piston 62 mounted inside console 8. Control lever 19 is attached to the shaft for rotating the shaft after it has been raised a desired height. The shaft is rotated so that the vanes are flattened to form a continuous surface for extracting a material from a container. Control switches 202 and 64, connected inside the base portion of container 2, are tripped by movement of lever 19. Lever 19 may be replaced by off-on switches for switches 63 and 64. The shaft has a sharp point 106 at the tip thereof for puncturing portion 109 of the container 65 enclosing a first compound so that an air hole is provided during extraction to prevent a vacuum build up in container 65. Locking devices 66 and 67 secure container 65 inverted over container 2 during extraction.

Referring now to FIG. 3 wherein a specific embodiment of container 4 and weighing device 16 is shown. Container 4 is mounted on shaft 68. Console 8 has a hole through the top thereof of sufficient dimension to allow a bottom portion of container 4 to move up and down a limited distance, being limited by the flanged portion 201 thereof. Shaft 68 is suspended by spring 69 and is supported along its axis by frictionless bearings 70 and 71 including means for supporting the bearings. The bottom portion of container 4 has a slot 72 into which locking pin 17 mates.

Weighing device 16 is shown as being comprised of light source 73 of variable intensity, attached to console 8, shutter 74 affixed to shaft 68, and cell 75 sensitive to light source 73 attached to console 8 along the same plane as the source. As the shaft descends, the shutter allows more light to be incident on the cell which generates an electrical signal which causes a calibrated deflection on the weighing indicator. Other devices may also be used to detect weight or change in weight of container 4 or materials within container 4.

Referring now to FIG. 4 wherein is illustrated a specific embodiment of turret 7 and extruder 6 of the processing system. The extruder is shown inside a partial embodiment of container 4. Turret 7 is comprised of cylindrical shaft 107 movably mounted inside an enclosing cylinder 22. O rings 76 provide a fluid seal at the ends of shaft 107. Cylinder 22 has an opening 77 through which air is emitted as controlled by switches 25 and 26 on control panel 24. Adjustable stop 78 slides in groove 79 between limits as determined by the length of groove 79. Turret 7 may be manually moved so that the mixer and extruder may be rotated between container 9 and 4. Turret 7 is further comprised of horizontal member 21 to which are mounted tubes 41, 42, 43, and 44 (see FIG. 1).

Extruder 6 includes shaft 37 and plate 38, and motor 39 is secured to member 21 by fastening means such as locking nuts. Plate 38 may have a hole 80 through it for preventing creation of a vacuum when withdrawing the plate from within the container 4.

Referring now to FIG. 5 wherein is illustrated a specific embodiment of mixer 5. Motor 35 is driven by air pressure and is comprised of a shaft 81 which is secured to the motor by locking means 82.

Shaft 81 has locked thereto drive gear means 84 by keying means 83. Cover means 85 which fits over the top of containers 9 and 4 includes ring gear 86 which encircles the cover along the inside circumference thereof. Mated with both the drive and ring gear is a pinion gear 87 whereby a planetary gear system is formed. Shaft 88 of mixer paddle 36 is locked to pinion gear 87 by locking means 89 such as a bolt or locking nut. Paddle 36 is comprised of three sections, two outside blades, 90, 91 and an inside blade 92. Only the portions of mixer 5 which are material to a disclosure of a complete embodiment of a processing system are discussed. Other portions such as bearings, housings, keyway are obvious for a complete embodiment of a mixer as illustrated in FIG. 5.

Figure 6:
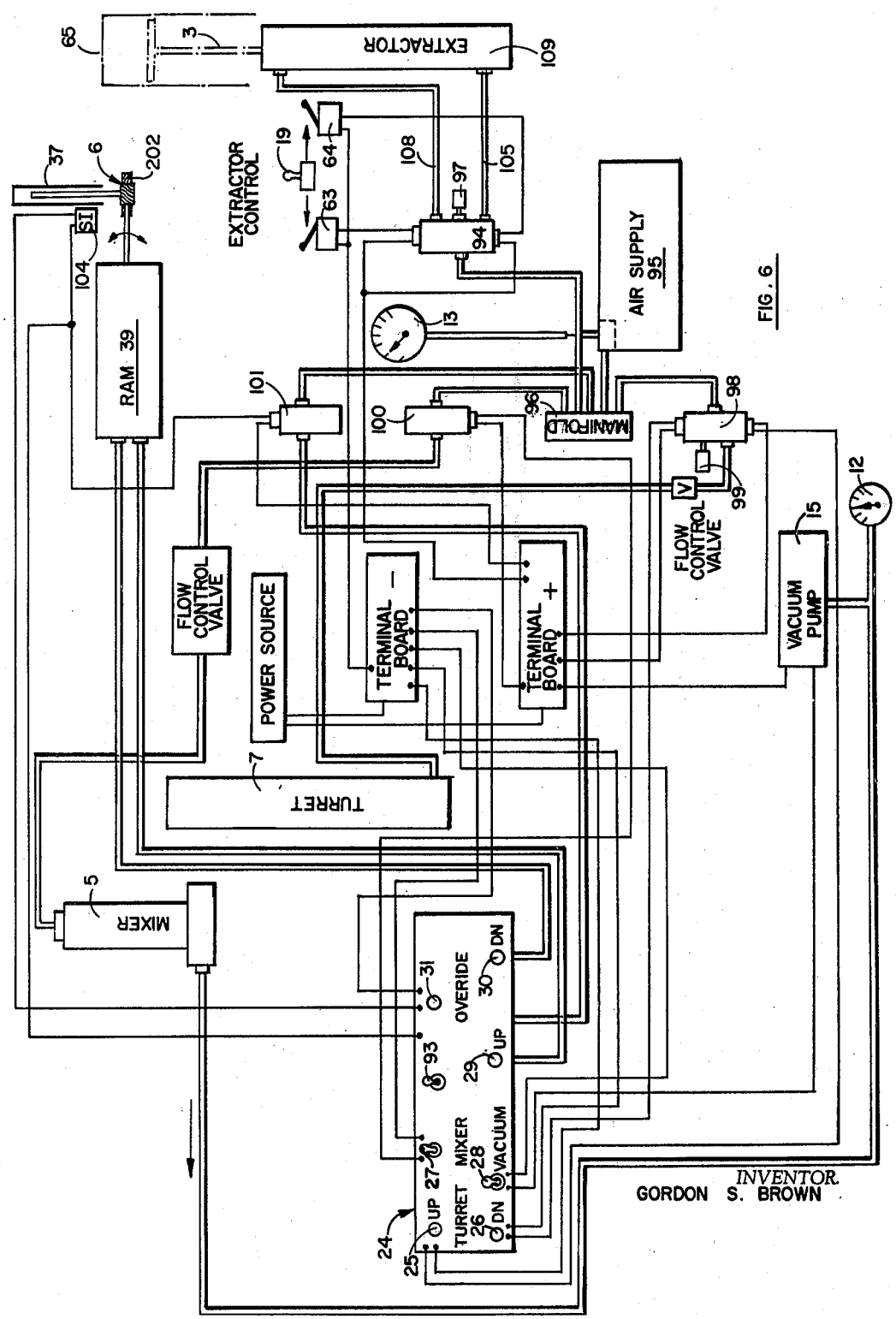
FIG. 6 is a schematic representation of various parts of the system connected to tubing and wiring.

FIG. 6 which illustrates the wiring and tubing for the processing system is used in describing an example of system operation. A container 65 of a first material such as either a viscous or non-viscous material is inverted and secured on container 2. If the material is in a pourable state it may be poured directly into either container 2 or 4. Lever 19 is pushed to the right thereby activating switch 64 to cut on solenoid valve 94. Air from supply 95 is forced through manifold 96 and through various sections of tubing to the base of the extractor for forcing the extractor up and through the material in container 65. When the extractor has reached the bottom of container 65 and an air hole is pierced therethrough, lever 19 is then rotated to the left manually in order to actuate switch 63 to reverse the flow through solenoid valve 94 so air pressure is directed in at the top of the extractor piston and the extractor is forced down pulling the material with it. Lever 19 may be replaced with off-on switches on the control panel for controlling the operation of the extractor and the vanes may be spring loaded to flatten out automatically against the material whenever the bottom of container 65 is reached thereby completely eliminating the need for lever 19. Air remaining in the base of the extractor is exhausted out through flow control outlet 97. As the material is pulled from the container 65 and into container 2 it is extruded through tubing 20 which is placed so that it enters container 4. Turret 7 is moved before the material is extruded into container 4 so that neither the mixer nor the extruder is placed in the container when the material is entering.

Whenever a predetermined amount of the material is inside container 4 as indicated on weighing meter 10, control lever 19 or an equivalent replacement as explained above, is manually rotated to a center position so that no further material is extruded into container 4. Air pressure into the air tubings (not material tubes) of the system is indicated by gage 13. Tubing 20 is removed from container 4. Locking pin 17 is moved into place to secure container 4 to console 8 (illustrated in FIG. 3). If desired, pump 49 may be activated so that fluid is circulated through container 2 for removing the residues. Tubing and switches for the pump are shown in FIG. 1. While container 2 is being cleaned by the circulating solvent, the turret is turned on through control panel 24 and rotated so that the mixer is over container 4. When over container 4 the down switch 26 is pushed thereby activating valve 98 so that air inside cylinder 22 used to raise the turret is slowly exhausted through flow control exhaust 99. As the air is exhausted the weight of the turret pushes the mixer paddle into the compound. When the cover is secured, the mixer switch 27 is turned on thereby actuating solenoid valve 100 so that air is directed to motor 35 for causing mixer blade rotation. During mixing the driver and gears 84 and 86 impart a rotating and planetary motion to the pinion gear 87 so that the mixer blades mix the material. When the cover has been secured to container 4 the vacuum switch 28 is turned on so that vacuum pump 15 maintains a vacuum inside container 4 and draws off gases released during mixing. After a while, for example, three minutes, depending on the type of material being mixed, a second material may be added, for example, a catalyst. If no second material is necessary, mixing would continue for a desired period and the material would be extruded from the container. If a second material such as a catalyst is added it is poured or placed into measuring device 11 (see FIG. 1) and visually measured to determine a desired quantity. After a desired quantity has been placed inside measuring device 11 valve means 47 is turned allowing the vacuum inside weighing container 4 to pull the material through tubing 23 into the container where it is mixed with the first material. Valve means 47 is turned off as soon as the second material is pulled into the container. Weighing device 16 may be calibrated to an accuracy which would enable an operator to measure with more precision the amount of a second material placed inside container 4. The two materials are mixed for approximately ten minutes depending on the type of material comprising the materials and then the vacuum is turned off, the mixer is turned off, the cover is freed from container 4, up switch 25 for turret 7 is turned on so that the mixer is pulled out of the mixed compounds. Horizontal member 21 and turret 7 are rotated so that the mixer is placed over container 9 and the extruder is placed over container 4. The turret down switch 26 and the extruder off-on switch 93 is pushed so that the extruder is lowered into container 4. Simultaneously the mixer is lowered and secured to container 9. Appropriate valve means on tubing 45 and 46 are turned on and pump 49 is activated so that cleaning solvent is circulated through container 9 for cleaning the mixer paddle. (See FIG. 1 for illustration of cleaning portion of the system.) Solvent container 14 may be equipped with appropriate filters so that residues are retained inside the container. At the same time that the mixer is being cleaned the down extruder switch 30 is activated so that solenoid 101 is turned on for driving motor 39. Motor 39 is driven so that gear 40 through gear 202 engages shaft 37 and drives shaft 37 and plate 38. Valve means 110 and 111 are turned on so that the mixed compound may flow through tubes 32 and 33 into a container such as a mold for forming the mixed material. As the shaft is driven downward the material is extruded. As the shaft moves up or down switch 104 is normally closed and does not interfere with extrusions of the material, however, after a certain distance has been traveled either up or down a stop is encountered which opens the switch and turns solenoid 101 off. When solenoid 101 is off the extruder is cut off. If additional drive is needed it is necessary to press the override switch 31 thereby closing switch 104 and activating solenoid 101. Whenever all the material desired is extruded from the container the up switch 29 is turned on and the blade and ram are drawn upwards by reversing the direction of motor 39. On-off switch 93 must be turned on before the extruding portion will operate. Container 4 may be cleaned in the same manner as either container 9 or 2.

*Summary*

The semi-automatic processing system for either viscous or non-viscous materials is comprised of means whereby a material may be extracted from its container, mixed in another container with another material and degassed at the same time. After mixing, the combined materials are extruded from the mixing container into a mold or other container, etc. Means are includetd for weighing and measuring the quantities of the materials mixed, and for cleaning the several containers used in processing the material.

Although the invention has been illustrated and described in detail, it is to be clearly understood that the same is by way of illustration and example only and is not to be taken by way of limitation, the spirit and scope of this invention being limited only by the terms of the appended claims.

I claim:
1. A processing system comprising:
   means for forcibly extracting a first compound from a first container into second container means, said means comprising vane means forming a surface for pulling said first compound from the first container, said means including deflecting means for permitting upward movement of said vane means through said first compound, said vane means further including container piercing means for puncturing the remote end of the container before pulling said compound from said container, third container means connected to receive at least a portion of said first compound from said second container means;
   means for injecting into said third container a second compound;

means associated with said third container for mixing said first and second compounds;
means for extruding said first and second compounds after mixing; and
means for cleaning at least said mixing means simultaneously with extrusion of said compound.

2. The device as recited in claim 1 wherein is included means for cleaning at least said mixing means, and said second containing means simultaneously with said extrusion.

3. The device as recited in claim 1 wherein is included means for weighing said third container and its contents.

4. The device as recited in claim 1 wherein is included means for exhausting gases from said third container.

References Cited by the Examiner
UNITED STATES PATENTS

| | | | |
|---|---|---|---|
| 1,482,279 | 1/1924 | Trust et al. | 259—102 |
| 1,762,081 | 6/1930 | Schleicher | 259—102 |
| 2,123,712 | 7/1938 | Clark | 222—80 |
| 2,453,914 | 11/1948 | Hollenbach | 259—7 |
| 2,769,576 | 11/1956 | Stevens | 222—80 |
| 2,847,196 | 8/1958 | Franklin et al. | 259—8 |
| 3,067,987 | 12/1962 | Ballou et al. | 259—7 |

WALTER A. SCHEEL, *Primary Examiner.*
JOHN M. BELL, *Assistant Examiner.*